United States Patent
Chiang et al.

(10) Patent No.: US 8,259,090 B2
(45) Date of Patent: Sep. 4, 2012

(54) 3-DIMENSION NON-BIAS ELECTRETS MULTI-TOUCH DEVICE

(75) Inventors: Dar-ming Chiang, Hsinchu (TW); Jen-luan Chen, Hsinchu (TW); Shu-ru Lin, Hsinchu (TW); Yan-ren Chen, Hsinchu (TW)

(73) Assignee: Taiwan Electrets Electronics Co., Ltd., Hsinchu (TW)

( * ) Notice: Subject to any disclaimer, the term of this patent is extended or adjusted under 35 U.S.C. 154(b) by 478 days.

(21) Appl. No.: 12/553,008

(22) Filed: Sep. 2, 2009

(65) Prior Publication Data

US 2010/0309145 A1 Dec. 9, 2010

(30) Foreign Application Priority Data

Jun. 4, 2009 (TW) ................................ 98118595 A

(51) Int. Cl.
*G06F 3/043* (2006.01)
(52) U.S. Cl. ..... 345/177; 345/174; 345/173; 178/18.04; 178/18.06
(58) Field of Classification Search ................. 345/173, 345/174, 177; 178/18.01, 18.03, 18.05, 18.06, 178/18.07, 18.04
See application file for complete search history.

(56) References Cited

U.S. PATENT DOCUMENTS

| 5,411,790 A * | 5/1995 | Ogawa et al. | 428/209 |
| 6,118,889 A * | 9/2000 | Izuno et al. | 382/119 |
| 6,525,717 B1 * | 2/2003 | Tang | 345/177 |
| 2002/0154100 A1 * | 10/2002 | Hatakeda et al. | 345/173 |
| 2008/0225015 A1 * | 9/2008 | Hashida | 345/173 |
| 2009/0115741 A1 * | 5/2009 | Wang et al. | 345/173 |

* cited by examiner

*Primary Examiner* — Adam R Giesy
(74) *Attorney, Agent, or Firm* — Cheng-Ju Chiang

(57) ABSTRACT

Disclosed is a 3-dimension non-bias electrets multi-touch device, comprising a first electrets thin film providing a first bias electric charge to form an electrostatic field, a first electrode, a second electrode and a controller. The first electrode is attached to the first electrets thin film and outputs a first signal when the electrostatic field is changed by a deformation of the first electrets thin film due to contact pressures of external forces. The second electrode outputs a second signal when the electrostatic field is changed. The first and second electrodes transmit the first and second signals to the controller. The controller is capable to detect and analyze positions where the contact pressures of the external forces are applied and normal vector shifts of the first electrets thin film at the positions.

39 Claims, 5 Drawing Sheets

3-DIMENSION NON-BIAS ELECTRETS MULTI-TOUCH DEVICE

BACKGROUND OF THE INVENTION

1. Field of the Invention

The present invention generally relates to an electrets touch device, and more particularly to a 3-dimension non-bias electrets multi-touch device capable of determining coordinates of first and second directions of an external force and quantifying the external force in the third direction.

2. Description of Prior Art

With the progress of modern technology, the life quality significantly gets better than ever and the consumable electronic products are presented to the public so rapidly. A touch control device which is a kind of input interface for a better humanity design and combining the display has been developed. Such touch control device makes interactions of the human interface device friendlier and also more accurate. A Finger or a stylus can be utilized to click and input via function indications shown on the display of the touch control device. Even directly writing or painting by the finger or the stylus can be realized almost without any learning. Moreover, such touch control device combining the display occupies less space and appearance of an electronic product than the traditional input interface, e.g. keypad or mouse. Such touch control device fits in with miniaturization trend of the consumable electronic products in this modern time. Therefore, such touch control device replaces other types of input interfaces and gradually becomes a main stream recently in PDA, PND, mobile phone, notebook, ATM and etc. Furthermore, the multi-touch function presented by iphone of Apple company in 2007 starts a tremendous campaign about developing and researching the touch control device in the related industries. Since then, related technologies progresses so rapidly. The mobile phones published recently by the famous mobile phone manufacturer, Nokia, also utilize the touch control device for the input interface. It seems that the touch control device will become a standard interface for the Nokia mobile phone definitely.

The touch control technique in development comprises Optics, ultrasonic, electromagnetic, resistive and capacitive touch devices. The resistive and capacitive touch devices are the main stream techniques and well-developed thereamong. The resistive touch device is mainly applied in low-price products, such as, consumer mobile phones, PDA, PND and etc. The capacitive touch device is generally applied in high-price products, such as ATM, industry equipments and etc. For example, the second generation TouchSmart PC of HP company and the iphone of Apple company both utilize the capacitive touch device as being the touch pads. However, the surface of the resistive touch device is easily scratched and the sensitivity is worst so that a larger contact pressure is necessary for detection. The capacitive touch device has higher sensitivity but the manufacture processes are more complicated. Besides, there is also a drawback of the capacitive touch device existing. That is, non-conductive objects, such as, a stylus and a fingertip cannot be utilized for inputting operation.

In the U.S. Pat. Nos. 6,819,316B2, 7,030,860B1 and 7,154,481B2, capacitive touch devices are disclosed to detect touch coordinates according to capacitance change caused by a deformation due to contact pressure. Meanwhile, the disclosed capacitive touch devices are also flexible. In the U.S. Pat. Nos. 7,260,999B2 and 7,511,702B2, capacitive touch devices are disclosed to detect the touch coordinates and external force strength according to capacitance change caused by the deformation due to the contact pressure. However, what is disclosed is that the touch coordinates and the external force strength are detected by different sensing circuits. Moreover, for all the capacitive touch devices disclosed in the aforesaid patents, extra bias voltages are necessary to be provided between upper and lower substrates of the capacitive touch devices for touch control function. Accordingly, the circuits and the physical structures of the capacitive touch devices must become more complicated. The extra bias voltages will also cost a certain power consumption to lead the usage time of the electronic product inextensible. Considering the miniaturization trend of the consumable electronic products in this modern time, the short usage time is a principal factor that the consumable electronic products cannot be popular.

SUMMARY OF THE INVENTION

For solving drawbacks of the prior art, an objective of the present invention is to provide a 3-dimension non-bias electrets multi-touch device, comprising a first electrets thin film, a first electrode, a second electrode and a controller. The first electrets thin film provides a first bias electric charge to form an electrostatic field. The first electrode is attached to the first electrets thin film and outputs a first signal when the electrostatic field is changed by a deformation of the first electrets thin film due to contact pressures of a plurality of external forces (Multi-touch). The second electrode outputs a second signal when the electrostatic field is changed. After the controller receives the first signal and the second signal from first independent electrode patterns of the first electrode and second independent electrode patterns of the second electrode respectively, the controller analyze positions where the contact pressures of the external forces are applied to the first electrets thin film and normal vector shifts of the first electrets thin film at the positions (The positions, i.e. a first coordinate and a second coordinate and normal vector shift, i.e. a third coordinate represent three dimensions). The deformation of the first electrets thin film at the center of contact press position is biggest and the electrostatic field changes most. The change of the electrostatic field decreases gradually when the distance increases from the center of contact press position. Therefore, the controller of the present invention can analyze not only the normal vector shift at the center of contact press position but also tiny change of the electrostatic field around the center.

The 3-dimension non-bias electrets multi-touch device of the present invention further comprises a protective layer, a space layer and a substrate. The protective layer is attached to the first electrode oppositely with the first electrets thin film to protect the first electrode. To prevent possible scratches caused by the external forces and environment damages. The space layer is utilized to separate the first electrets thin film and the substrate. The substrate is employed as being a carrier of the multi-touch device. The substrate can be a surface of any types of displays. Moreover, due to the flexibly structured property of the electrets thin films of the present invention, there is not restriction about the appearance of the substrate in the present invention, for example, the substrate can be tablet shaped or arc shaped.

Furthermore, the multi-touch device of the present invention further comprises a second electrets thin film separately and oppositely positioned from the first electrets thin film. For example, second electrets thin film can be attached to the substrate. The second electrets thin film provides a second bias electric charge to form the electrostatic field with the first bias electric charge together. When the multi-touch device receives the contact pressures of the external forces and the deformation of the first electrets thin film occurs thereby, the relative positions of the first and second electrets thin films change. Accordingly, the electrostatic field formed by the first and second electrets thin films also changes and the aforesaid first and second signals are generated.

The 3-dimension non-bias electrets multi-touch device provided by the present invention has many advantages. For example, with high sensitivity as same as the capacitive touch device but both conductive objects, such as, a finger, a probe, and non-conductive objects, such as, a stylus, a fingertip can be utilized for contact pressing the multi-touch device. Moreover, comparing with the capacitive or the resistive touch devices, the multi-touch device of the present invention has advantages of simple structure and low manufacture cost. Furthermore, there is no need to provide extra bias voltages to the multi-touch device. The power consumption and usage time of the multi-touch device can be further improved.

DETAILED DESCRIPTION OF THE INVENTION

Figure 1:
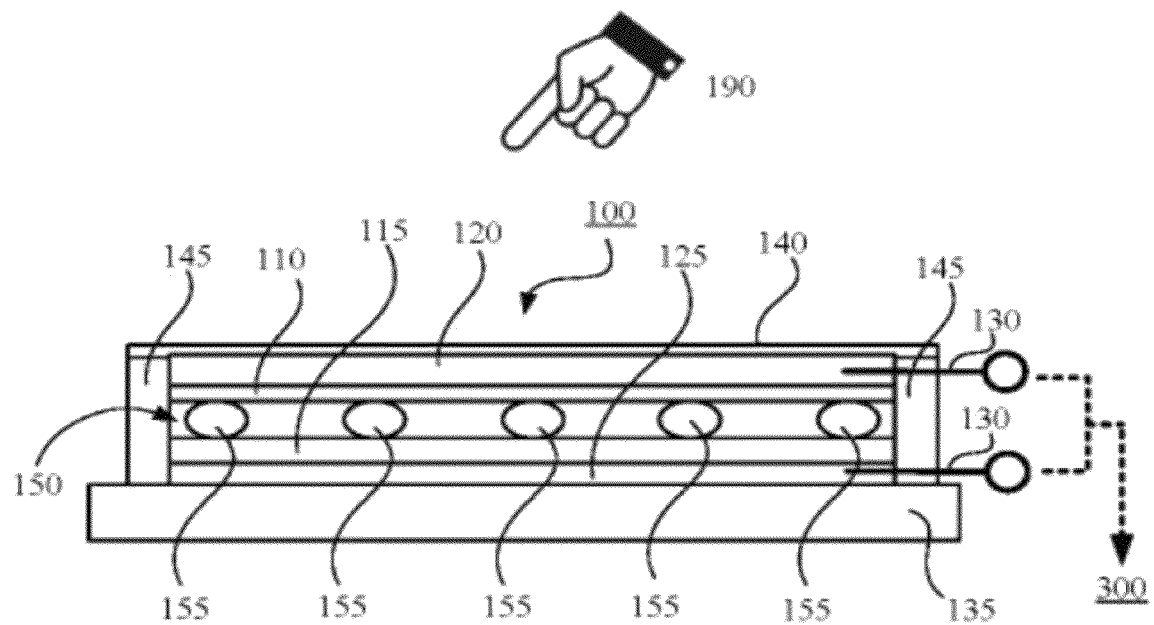
FIG. 1 depicts a sectional diagram of a 3-dimension non-bias electrets multi-touch device according to a first embodiment of the present invention.

Please refer to FIG. 1, which depicts a sectional diagram of a 3-dimension non-bias electrets multi-touch device according to a first embodiment of the present invention. In this embodiment, the 3-dimension non-bias electrets multi-touch device 100 comprises a first electrets thin film 110, a second electrets thin film 115, a first electrode 120, a second electrode 125, conductive transmission lines 130, a substrate 135, a protective layer 140, package material 145, a space layer 150 and a controller 300. The first electrets thin film 110 is positioned at the underside of the first electrode 120. The protective layer 140 is positioned at the upper side of the first electrode 120. The second electrets thin film 115 is separated by the space layer 150 and positioned oppositely from the first electrets thin film 110.

The first electrets thin film 110 provides a first bias electric charge and the second electrets thin film 115 provides a second bias electric charge. The first bias electric charge and the second bias electric charge form an electrostatic field distributed between the first electrets thin film 110 and the second electrets thin film 115. Moreover, an electricity of the first bias electric charge is opposite to that of the second bias electric charge. If the electricity of the first bias electric charge is positive, the electricity of the second bias electric charge is negative. The first electrode 120 is attached to the first electrets thin film 110. When a deformation of the first electrets thin film 110 occurs due to contact pressures of external forces and then the electrostatic field is changed, the first electrode 120 outputs a first signal to the controller 300 via the conductive transmission lines 130. Meanwhile, the second electrode 125 also outputs a second signal to the controller 300 via the conductive transmission lines 130 when the electrostatic field is changed by the deformation of the first electrets thin film 110 due to the contact pressures of the external forces from a user 190.

The first electrode 120 and the second electrode 125 comprise a plurality of first independent electrode patterns and second independent electrode patterns respectively (detail described later). The controller 300 scans the first, second independent electrode patterns and receives the first signal and the second signal therefrom. And then, the controller 300 can analyze positions where the contact pressures of the external forces are applied to the first electrets thin film 110 and normal vector shifts of the first electrets thin film 110 at the aforesaid positions (detail described later). The protective layer 140 is attached to the first electrode 120 and positioned oppositely with the first electrets thin film 120, i.e. the surface receiving the contact pressures of the external forces from the user 190. The protective layer 140 protects the first electrode 120 to prevent possible scratches caused by the external forces and environment damages.

The substrate 135 is employed as being a carrier of the whole 3-dimension non-bias electrets multi-touch device and the substrate 135 can be a surface of any types of displays, for example, CRT, LCD, LED, OLED or plasma displays. The present invention does not restrict the appearance of the substrate. Meanwhile, with the flexibly structured property of the first, second electrets thin films 110, 115 of the present invention, the multi-touch device of the present invention also can be flexible. Therefore, the shape of the substrate 135 is not restricted, for example, the substrate 135 can be tablet shaped or arc shaped. Basically, the 3-dimension non-bias electrets multi-touch device of the present invention can meet surfaces of arbitrary appearance.

The space layer 150 utilized to separate the first electrets thin film 110 from the second electrets thin films 115, the second electrode 125 and the substrate 135. The second electrets thin film 115 is attached to the substrate 135. In this embodiment, the space layer 150 can comprise a plurality of spacers 155 positioned independently and packaged with the package material 145. The spacers 155 are averagely positioned between the first electrets thin film 110 and the second electrets thin films 115.

Figure 2:
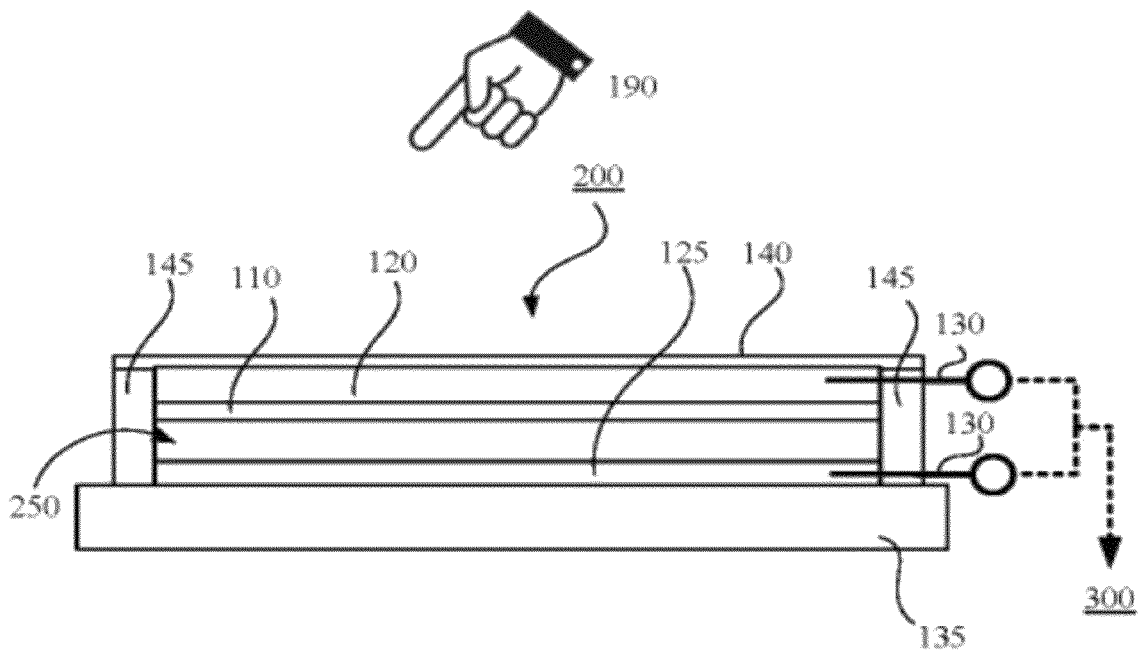
FIG. 2 depicts a sectional diagram of a 3-dimension non-bias electrets multi-touch device according to a second embodiment of the present invention.

Please refer to FIG. 2, which depicts a sectional diagram of a 3-dimension non-bias electrets multi-touch device according to a second embodiment of the present invention. In this embodiment, the 3-dimension non-bias electrets multi-touch device 200 similarly comprises a first electrets thin film 110, a first electrode 120, a second electrode 125, conductive transmission lines 130, a substrate 135, a protective layer 140, package material 145, a space layer 250 and a controller 300. What is different from the first embodiment is that the space layer 250 is one piece of spacer with recovery elasticity. When the user 190 releases the contact pressure applied to the first electrets thin film 110, the space layer 250 can recover as similar as silicone.

Significantly, in the second embodiment of the present invention, only the first electrets thin film 110 exists. The first bias electric charge provided thereby can form an electrostatic field. As the first electrets thin film 110 is positioned, the substrate 135 will carry a third bias electric charge with electrostatic induction caused by the first electrets thin film 110. The electricity of the third bias electric charge is opposite to that of the first bias electric charge provided by the first electrets thin film 110. And then, the first and third bias electric charges form the electrostatic field together. The electrostatic field is distributed between the first electrets thin film 110 and the substrate 135. In the first embodiment, with positioning the second electrets thin film 115, the electrostatic field formed and distributed therebetween can be more sensitive to promote the accuracy of the 3-dimension non-bias electrets multi-touch device. In the first embodiment, only positioning the first electrets thin film 110 can be implemented. In this second embodiment, further positioning the second electrets thin film 115 also can be illustrated as the same as the first embodiment.

Furthermore, the first electrets thin film 110 or the second electrets thin film 115 can be charged by high voltage corona or polarization. Because the first electrets thin film 110 or the second electrets thin film 115 comprise a plurality of nano/micro holes which can retain high bias electric charge in the long term. Therefore, there is no need to provide extra bias voltages for the multi-touch device like capacitive touch devices according to prior arts. Meanwhile, as applying to touch control function of a display, all the aforesaid first electrets thin film 110, second electrets thin film 115, first electrode 120, second electrode 125, substrate 135, protective layer 140, space layer 150 can be made of transparent materials. Specifically, the substrate 135 can be made of non-conductive transparent glass or non-conductive transparent plastic. The space layer 150 can be made of transparent rubber, transparent liquid glue or transparent plastic.

Materials of the first electrets thin film 110 or the second electrets thin film 115 can be selected from fluoropolymer, including polytetrafluoroethylene (PTFE), Fluorinated Ethylene Propylene (FEP), polyvinylidene fluoride (PVDF), and polyethylene (PE), polypropylene (PP), polyimide (PI), cyclo olefin copolymer (COC) and compounds thereof. The first electrode 120 and the second electrode 125 can be formed by physical vapor deposition (such as evaporation, sputtering or ion plating) or chemical vapor deposition (such as plasma). Materials of the first electrode 120 and the second electrode 125 can be selected from transparent conductive oxide (TCO), including Indium Tin Oxide (ITO), Indium Zinc Oxide (IZO), Zinc Tin Oxide (ZTO), Aluminum Zinc Oxide (AZO), transparent conductive polymer and carbon nanotube.

Figure 3:
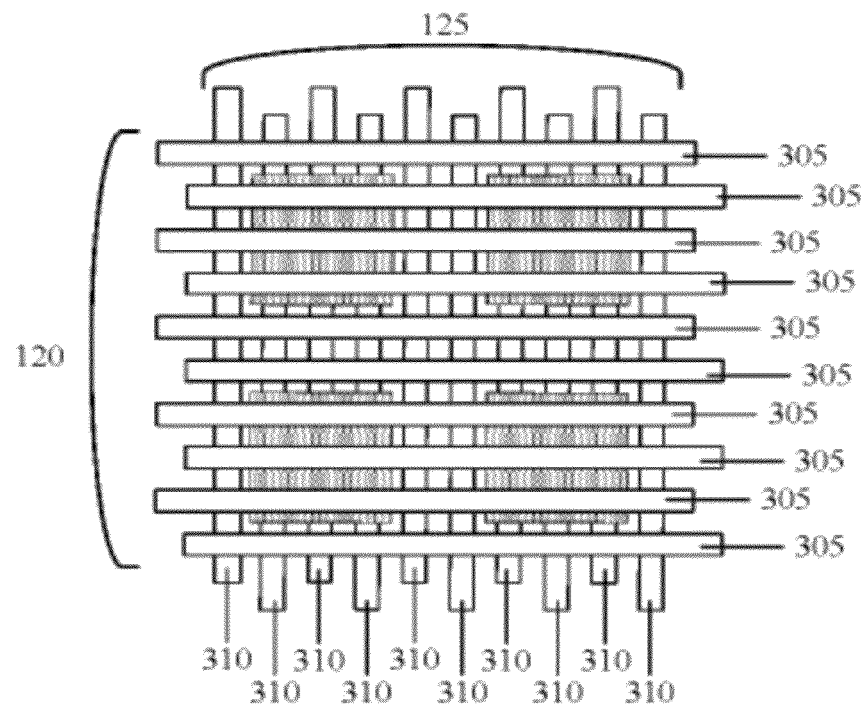
FIG. 3 shows an arrangement diagram of first, second electrodes and electrets thin films of the 3-dimension non-bias electrets multi-touch device according to the present invention.

Please refer to FIG. 3, which shows an arrangement diagram of first, second electrodes 120, 125 and electrets thin films of the 3-dimension non-bias electrets multi-touch device according to the present invention. FIG. 3 is a top view diagram of the multi-touch device. As shown in FIG. 3, the first electrode 120 comprises a plurality of first independent electrode patterns 305. The first independent electrode patterns 305 are bar shaped and arranged in parallel horizontally in this embodiment. The second electrode 125 comprises a plurality of second independent electrode patterns 310. The second independent electrode patterns 310 are bar shaped and arranged in parallel vertically in this embodiment. For example, the first electrets thin film can be sandwiched between the first independent electrode patterns 305 and the second independent electrode patterns 310. Although, the first, second independent electrode patterns 305, 310 are bars perpendicular with each other but the present invention has no restriction for the shapes of the aforesaid electrode patterns. The shapes of the aforesaid electrode patterns can be designed arbitrarily on design demands. Moreover, the first, second independent electrode patterns 305, 310 can be positioned in a single-layer structure or a multi-layer structure.

Figure 4:
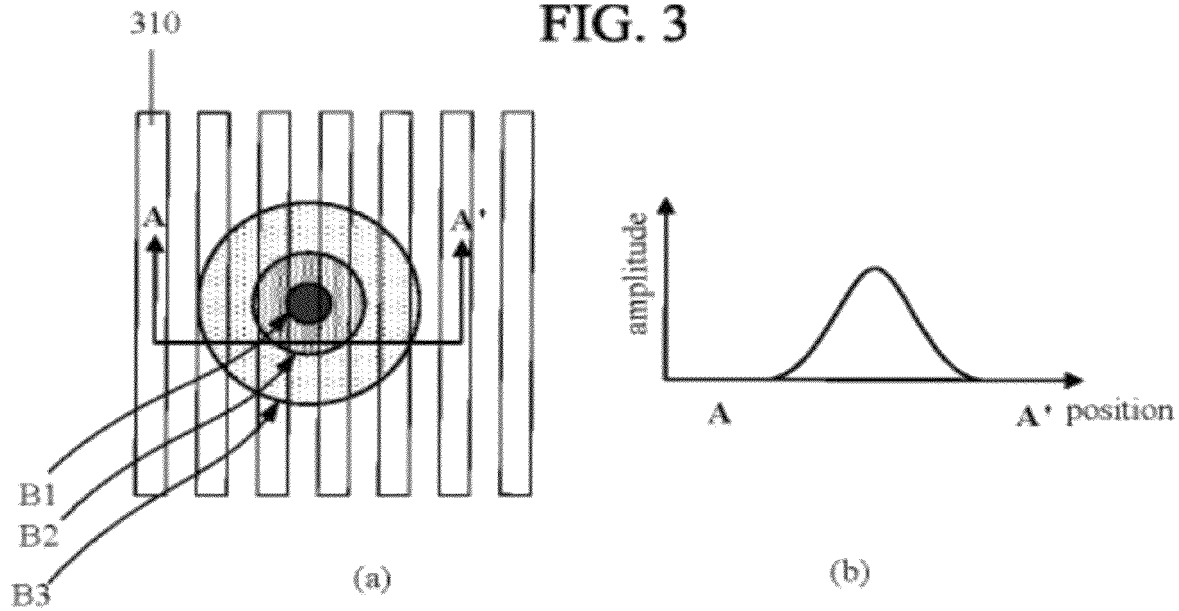
FIG. 4(a) and FIG. 4(b) depict a relationship diagram of a contact pressed deformation, an external force strength (pulse signal amplitude) and a position when the multi-touch device of the present invention shown in FIG. 3 is contact pressed.

Please refer to FIG. 4(a) and FIG. 4(b) depict a relationship diagram of a contact pressed deformation, an external force strength (pulse signal amplitude) and a position when the multi-touch device of the present invention shown in FIG. 3 is contact pressed. Taking the second independent electrode patterns 310 for example and as shown in FIG. 4(a), the deformation of the first electrets thin film 110 at the center position B1 of the contact press position is biggest when the user contact presses the multi-touch device. With the distance getting far away from the center position B1, such as the points B2 and B3 shown in figures, the deformation of the first electrets thin film 110 becomes smaller and smaller at the point B2 and at the point B3. The external force strength also gets smaller, accordingly. As shown in FIG. 4(b), which is a relationship diagram of positions between A-A' and the external force strength (pulse signal amplitude) in FIG. 4(a), the pulse signal amplitude gets smaller as the distance away from the center position increases. Moreover, if the external force strength is bigger, the pulse signal amplitude is bigger, too. As aforementioned, the controller of the present invention scans the first, second electrode patterns and receives the first signal and the second signal therefrom via the conductive transmission lines 130, and thereby analyze the position where the contact pressure of the external force is applied to the first electrets thin film 110 and the external force strength. The controller of the present invention can not only analyze the normal vector shift of the first electrets thin film 110 at the aforesaid center position but even tiny change of the electrostatic field around the center position.

Figure 5:
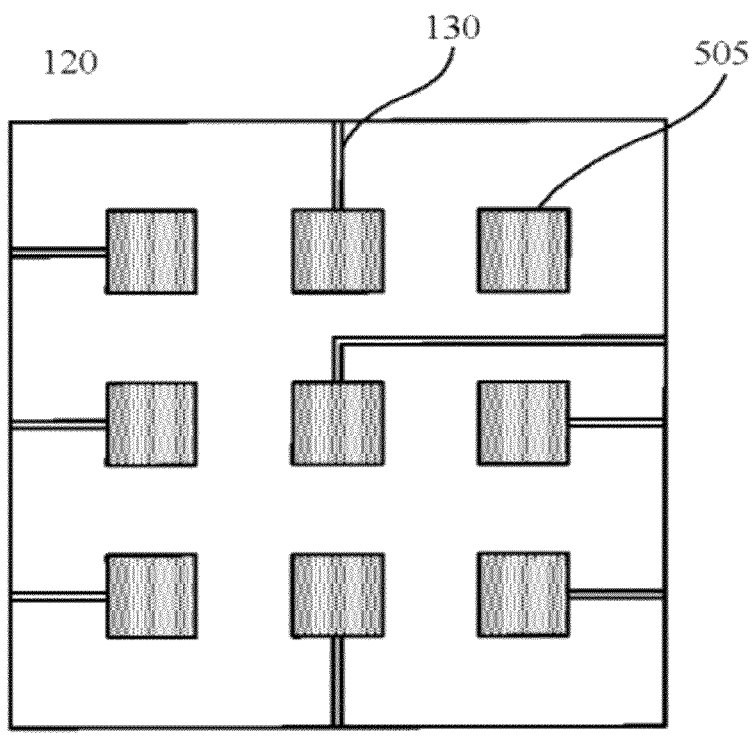
FIG. 5 depicts an arrangement diagram of a 3-dimension non-bias electrets multi-touch device according to a third embodiment of the present invention.

Please refer to FIG. 5, which depicts an arrangement diagram of a 3-dimension non-bias electrets multi-touch device according to a third embodiment of the present invention. In the third embodiment, the multi-touch device is applied for an electronic product which touch positions are regular, for example, the Automatic Teller Machine (ATM). The positions of the numeric keys 1~9 are fixed as shown in figure. Only the positions of the numeric keys are necessary to position the electrets thin films 550 which are attached with first electrode 120. The electrets thin films 550 are wired to the controller by conductive transmission lines 130. In the third embodiment of the present invention, the first electrode patterns are several independent and disconnected blocks. The second electrode patterns are also several independent and disconnected blocks. The first, second electrode patterns are set up at the positions of the numeric keys correspondingly.

Figure 6:
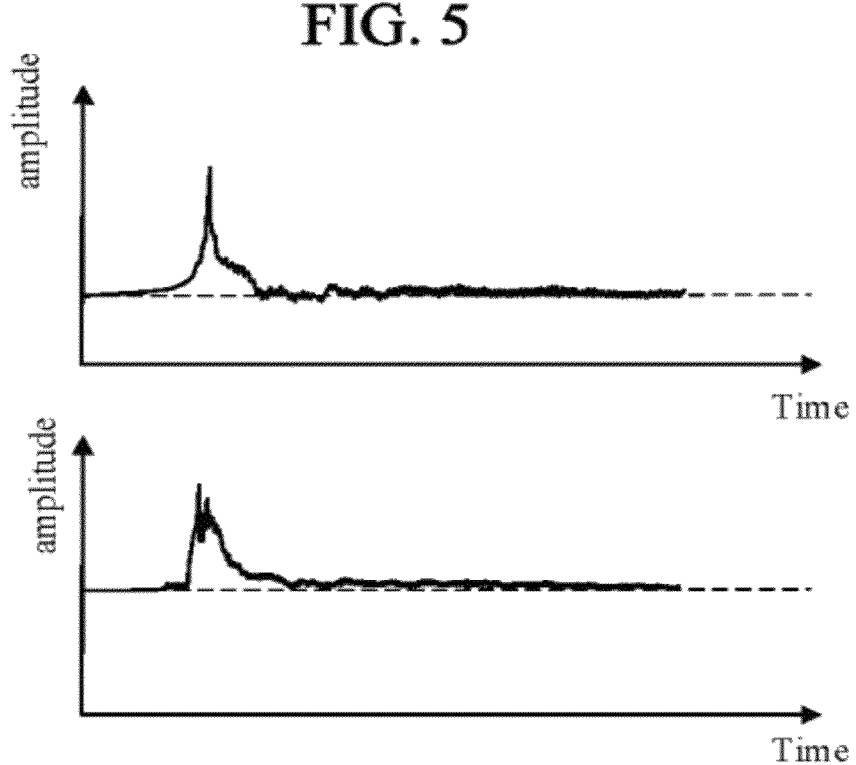
FIG. 6 depicts testing waveform diagrams when two independent electrode blocks of the 3-dimension non-bias electrets multi-touch device shown in FIG. 5 are contact pressed in a long time and simultaneously.

Please refer to FIG. 6, which depicts testing waveform diagrams when two independent electrode blocks (independent electrode patterns) of the 3-dimension non-bias electrets multi-touch device shown in FIG. 5 are contact pressed in a long time and simultaneously. When the user contact presses two positions of the multi-touch device at the same time, the controller will receive two pulse signals as shown in FIG. 6.

The pulse signals have peaks respectively and the amplitudes of the pulse signals decrease as time goes by. The testing waveform diagrams shows that the inventor contact presses two positions for testing but the multi-touch device of the present invention actually can detect contact pressures at multiple positions. Moreover, the deformation and the external force strength of each position can be analyzed accurately as shown in FIG. 4a and FIG. 4b.

Figure 7:
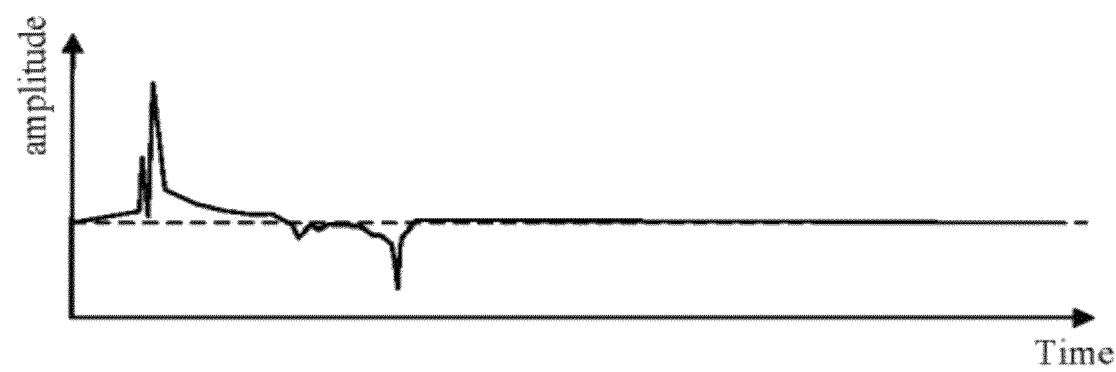
FIG. 7 depicts testing waveform diagrams when two independent electrode blocks of the 3-dimension non-bias electrets multi-touch device shown in FIG. 5 are contact pressed in a short time and at different moments.
Figure 7:
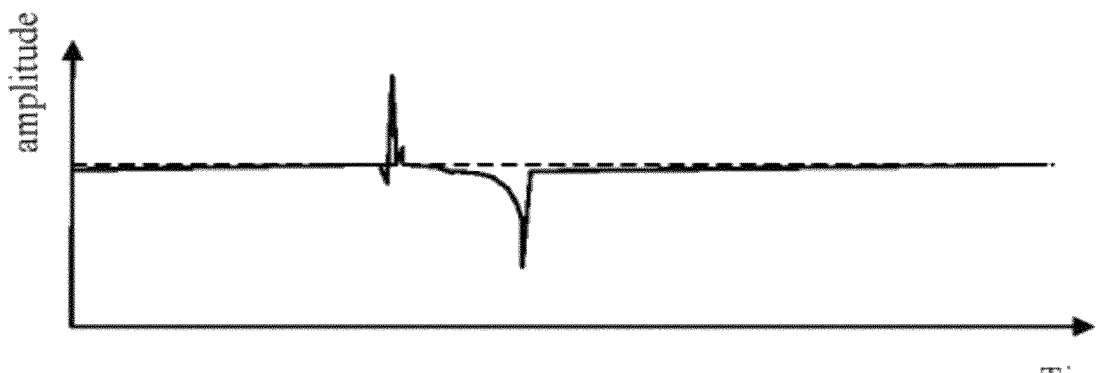

Please refer to FIG. 7, which depicts testing waveform diagrams when two independent electrode blocks (independent electrode patterns) of the 3-dimension non-bias electrets multi-touch device shown in FIG. 5 are contact pressed in a short time and at different moments. When the user contact presses two positions of the multi-touch device in a short time before and after, the controller will receive two pulse signals with respective two peaks (One positive peak and one negative peak) representing the external forces applied to the respective positions. The positive peak indicates that the electrets thin film is pressed with a normal vector shift. The negative peak indicates that the electrets thin film recovers. The two external forces are applied in a short time and therefore, the peaks of the pulse signals disappear rapidly. Meanwhile, the two positions are contact pressed by the external forces of the user before and after (The upper waveform shows the position contact pressed before; the lower waveform shows the position contact pressed after).

Figure 8:
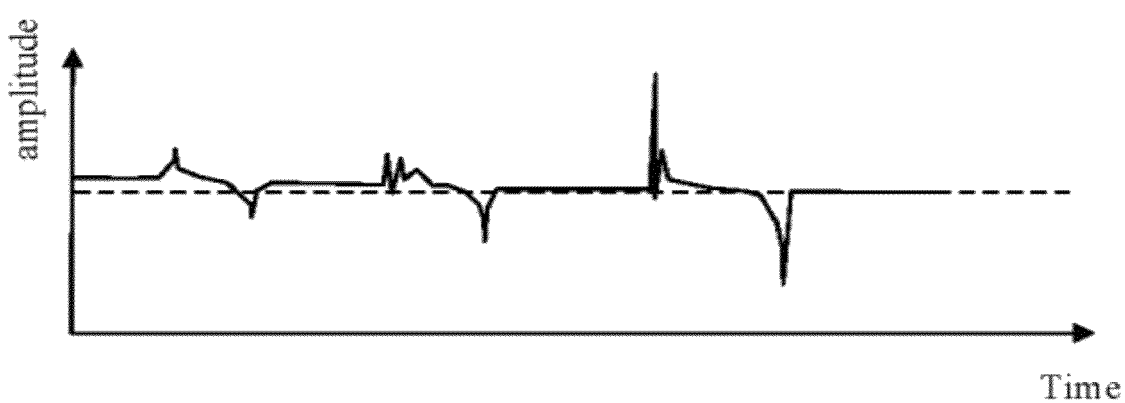
FIG. 8 depicts testing waveform diagrams when two independent electrode blocks of the 3-dimension non-bias electrets multi-touch device shown in FIG. 5 are contact pressed three little times crescendo.
Figure 8:
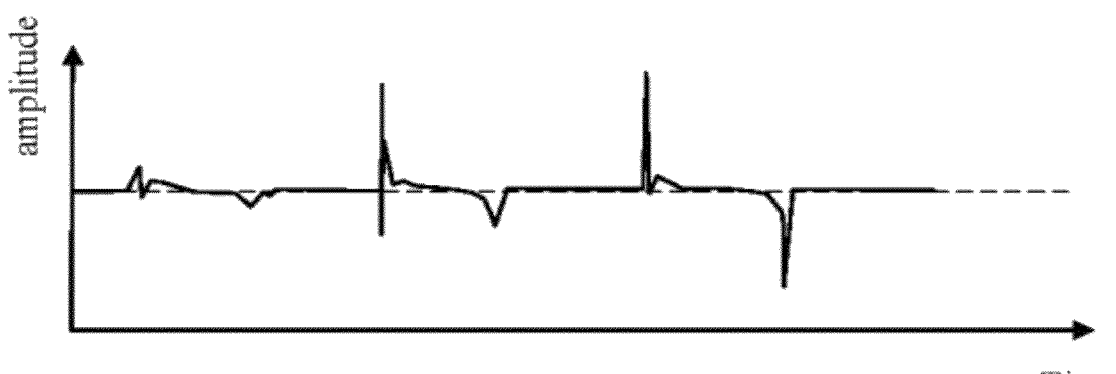

Please refer to FIG. 8, which depicts testing waveform diagrams when two independent electrode blocks (independent electrode patterns) of the 3-dimension non-bias electrets multi-touch device shown in FIG. 5 are contact pressed three little times (in a short time) crescendo. When the contact presses two positions of the multi-touch device three times quickly and crescendo, the controller will receive two pulse signals with respective peaks (Three positive peaks and three negative peaks) representing the external forces applied to the respective positions. The positive peak indicates that the electrets thin film is pressed with a normal vector shift. The negative peak indicates that the electrets thin film recovers. The two external forces are applied in a short time and therefore, the peaks of the pulse signals disappear rapidly. Meanwhile, the two positions are contact pressed by the external forces of the user about the same time.

Figure 9:
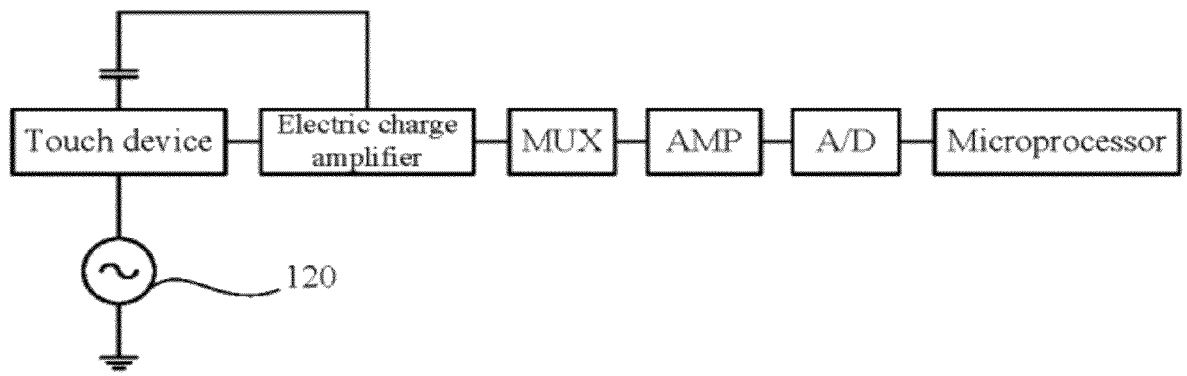
FIG. 9(a) shows a simple block diagram of a touch control device which an application of a bias voltage is necessary according to prior arts.
FIG. 9(b) shows a simple block diagram of a multi-touch device according to the present invention.
Figure 9:
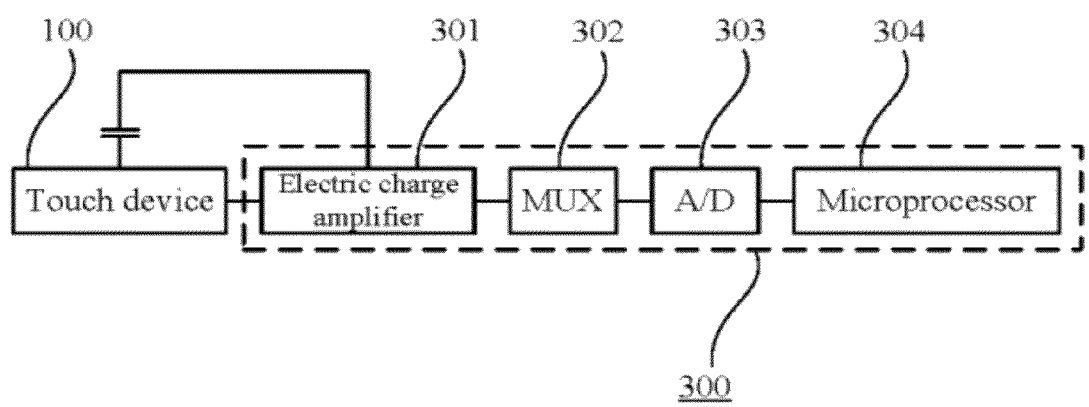

Please refer to FIGS. 9(a) and 9(b) show simple block diagrams of touch control devices according to prior arts and according to the present invention respectively. FIG. 9(a) shows a simple block diagram of a touch control device which an application of a bias voltage is necessary according to prior arts. FIG. 9(b) shows a simple block diagram of a multi-touch device without extra bias voltages and the whole control system according to the present invention. The 3-dimension non-bias electrets multi-touch device 100 of the present invention is coupled with the controller 300. The controller 300 comprises electrical charge amplifier 301, a multiplexer 302, an analog-to-digital converter 303 and a microprocessor 304. The electrical charge amplifier 301 amplifies the first signal and the second signal received from the first electrode and the second electrode of the 3-dimension non-bias electrets multi-touch device 100 via the conductive transmission lines respectively. The analog-to-digital converter 303 converts the first signal and the second signal into digital data. The microprocessor 304 calculates and processes the aforesaid digital data to analyze the positions where the contact pressures of the external forces are applied to the first electrets thin film and normal vector shifts of the first electrets thin film at the aforesaid positions.

In conclusion, the 3-dimension non-bias electrets multi-touch device provided by the present invention can detect and analyze positions of multi-touch operation and the normal vector shifts of the electrets thin film due to contact pressures of multiple external forces. Meanwhile, the 3-dimension non-bias electrets multi-touch device of the present invention is capable to realize high sensitivity as same as the capacitive touch device. However, both conductive objects, such as, fingers, probes, and non-conductive objects, such as, styluses fingertips can be utilized to contact press the 3-dimension non-bias electrets multi-touch device. Moreover, comparing with the capacitive or the resistive touch devices, the multi-touch device of the present invention has more advantages of simple structure and low manufacture cost. Significantly, there is no need to provide extra bias voltages to the 3-dimension non-bias electrets multi-touch device of the present invention. The power consumption and usage time of the electronic equipment which utilizes the 3-dimension non-bias electrets multi-touch device of the present invention can be further improved and better than it used to be.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A 3-dimension non-bias electrets multi-touch device, comprising:
    a first electrets thin film, providing a first bias electric charge to form an electrostatic field;
    a first electrode, attached to the first electrets thin film, outputting a first signal when the electrostatic field is changed by a deformation of the first electrets thin film due to contact pressures of a plurality of external forces;
    a second electrode, outputting a second signal when the electrostatic field is changed; and
    a controller, receiving the first signal and the second signal to analyze a plurality of positions where the contact pressures of the external forces are applied to the first electrets thin film and a plurality of normal vector shifts of the first electrets thin film at the positions.

2. The multi-touch device of claim 1, wherein the positions where the contact pressures of the external forces are applied are a plurality of first coordinates and second coordinates parallel with the first electrets thin film.

3. The multi-touch device of claim 1, wherein the normal vector shifts represent contact pressure values of the external forces.

4. The multi-touch device of claim 1, wherein the first electrets thin film can be contact pressed by a non-conductive body.

5. The multi-touch device of claim 1, wherein the first electrets thin film can be contact pressed by a conductive body.

6. The multi-touch device of claim 1, further comprising a protective layer, attached to the first electrode oppositely with the first electrets thin film to protect the first electrode.

7. The multi-touch device of claim 6, wherein the protective layer is made of transparent material.

8. The multi-touch device of claim 1, wherein the first electrode and the second electrode have a plurality of first independent electrode patterns and a plurality of second independent electrode patterns respectively, transmitting the first signal and the second signal corresponding to the positions and the normal vector shifts to the controller for being analyzed by the controller.

9. The multi-touch device of claim 8, wherein the first independent electrode patterns are parallel with each other, the second independent electrode patterns are parallel with each other and the first independent electrode patterns and the second independent electrode patterns are orthogonal.

10. The multi-touch device of claim 8, wherein the first and second independent electrode patterns are disconnected blocks and the first and second independent electrode patterns are in correspondence with each other.

11. The multi-touch device of claim 1, wherein the first and second independent electrode patterns are positioned in a single-layer structure.

12. The multi-touch device of claim 11, wherein the first and second independent electrode patterns are positioned in a multi-layer structure.

13. The multi-touch device of claim 1, wherein a material of the first electrets thin film can be selected from fluoropolymer, including polytetrafluoroethylene (PTFE), Fluorinated Ethylene Propylene (FEP), polyvinylidene fluoride (PVDF), and polyethylene (PE), polypropylene (PP), polyimide (PI), cyclo olefin copolymer (COC) and compounds thereof.

14. The multi-touch device of claim 1, wherein an electricity of the first bias electric charge is positive or negative.

15. The multi-touch device of claim 1, wherein the first electrets thin film comprises electrets which retain the first bias electric charge in the long term after being charged.

16. The multi-touch device of claim 15, wherein the first electrets thin film is charged by high voltage corona or polarization.

17. The multi-touch device of claim 1, further comprising a second electrets thin film providing a second bias electric charge to form the electrostatic field with the first bias electric charge together.

18. The multi-touch device of claim 17, wherein the second electrets thin film is made of transparent material.

19. The multi-touch device of claim 17, wherein a material of the second electrets thin film can be selected from fluoropolymer, including polytetrafluoroethylene (PTFE), Fluorinated Ethylene Propylene (FEP), polyvinylidene fluoride (PVDF), and polyethylene (PE), polypropylene (PP), polyimide (PI), cyclo olefin copolymer (COC) and compounds thereof.

20. The multi-touch device of claim 17, wherein an electricity of the second bias electric charge is positive or negative.

21. The multi-touch device of claim 17, wherein the second electrets thin film comprises electrets which retain the first bias electric charge in the long term after being charged.

22. The multi-touch device of claim 21, wherein the second electrets thin film is charged by high voltage corona or polarization.

23. The multi-touch device of claim 1, further comprising a substrate, being a carrier of the multi-touch device.

24. The multi-touch device of claim 23, wherein the second electrode is attached to the substrate.

25. The multi-touch device of claim 23, further comprising a space layer to separate the first electrets thin film and the substrate.

26. The multi-touch device of claim 25, wherein the space layer comprises a plurality of spacers positioned independently.

27. The multi-touch device of claim 25, wherein the space layer is a spacer with recovery elasticity.

28. The multi-touch device of claim 25, wherein the space layer is made of transparent rubber, transparent liquid glue or transparent plastic.

29. The multi-touch device of claim 23, wherein the substrate is a surface of a display.

30. The multi-touch device of claim 23, wherein the substrate is tablet shaped.

31. The multi-touch device of claim 23, wherein the substrate is arc shaped.

32. The multi-touch device of claim 23, wherein the substrate is made of transparent material.

33. The multi-touch device of claim 23, wherein the substrate is made of non-conductive transparent glass or non-conductive transparent plastic.

34. The multi-touch device of claim 23, wherein the second electrode attached to the substrate provides a third bias electric charge which electricity thereof is opposite to that of the first bias electric charge with electrostatic induction caused by the first bias electric charge.

35. The multi-touch device of claim 1, wherein the second electrode is attached to an opposite side of the first electrets thin film attached with the first electrode.

36. The multi-touch device of claim 1, wherein the first electrode and the second electrode are formed by physical vapor deposition or chemical vapor deposition.

37. The multi-touch device of claim 1, wherein materials of the first and second electrodes can be selected from transparent conductive oxide (TCO), including Indium Tin Oxide (ITO), Indium Zinc Oxide (IZO), Zinc Tin Oxide (ZTO), Aluminum Zinc Oxide (AZO), transparent conductive polymer and carbon nano-tube.

38. The multi-touch device of claim 1, wherein the multi-touch device is flexibly structured.

39. The multi-touch device of claim 1, wherein the first electrets thin film, the first electrode and the second electrode are made of transparent material.

* * * * *